United States Patent
Senior et al.

(10) Patent No.: US 9,202,464 B1
(45) Date of Patent: Dec. 1, 2015

(54) CURRICULUM LEARNING FOR SPEECH RECOGNITION

(71) Applicant: Google Inc., Mountain View, CA (US)

(72) Inventors: Andrew William Senior, New York City, NY (US); Marc'Aurelio Ranzato, Mountain View, CA (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 13/859,692

(22) Filed: Apr. 9, 2013

Related U.S. Application Data

(60) Provisional application No. 61/715,777, filed on Oct. 18, 2012.

(51) Int. Cl.
| | |
|---|---|
| *G10L 15/00* | (2013.01) |
| *G06F 15/18* | (2006.01) |
| *G10L 15/16* | (2006.01) |
| *G06N 3/02* | (2006.01) |

(52) U.S. Cl.
CPC . *G10L 15/16* (2013.01); *G06N 3/02* (2013.01)

(58) Field of Classification Search
CPC ......... G10L 15/00; G10L 15/02; G10L 15/08; G10L 15/16; G10L 2015/00; G10L 2015/08; G06N 3/02; G06N 3/04
USPC ........ 704/231, 232, 256.1–256.5; 706/15, 16, 706/26
See application file for complete search history.

(56) References Cited

U.S. PATENT DOCUMENTS

| | | | | |
|---|---|---|---|---|
| 5,867,816 | A * | 2/1999 | Nussbaum | 704/232 |
| 6,026,358 | A * | 2/2000 | Tomabechi | 704/232 |
| 6,041,299 | A * | 3/2000 | Schuster et al. | 704/232 |
| 6,151,592 | A * | 11/2000 | Inazumi | 706/16 |
| 6,731,307 | B1 * | 5/2004 | Strubbe et al. | 715/727 |
| 6,808,392 | B1 | 10/2004 | Walton | |
| 2007/0294768 | A1 * | 12/2007 | Moskovitch et al. | 726/24 |
| 2012/0239403 | A1 * | 9/2012 | Cano et al. | 704/254 |
| 2013/0246322 | A1 * | 9/2013 | De Sousa Webber | 706/18 |

OTHER PUBLICATIONS

Pavelka, Tomáš, and Pavel Král. "Neural network acoustic model with decision tree clustered triphones." Machine Learning for Signal Processing, 2008. MLSP 2008. IEEE Workshop on. IEEE, 2008.*

(Continued)

*Primary Examiner* — Paras D Shah
(74) *Attorney, Agent, or Firm* — McDonnell Boehnen Hulbert & Berghoff LLP

(57) ABSTRACT

Methods and apparatus related to training speech recognition devices are presented. A computing device receives training samples for training a neural network to learn an acoustic speech model. A curriculum function for speech modeling can be determined. For each training sample of the training samples, a corresponding curriculum function value for the training sample can be determined using the curriculum function. The training samples can be ordered based on the corresponding curriculum function values. In some embodiments, the neural network can be trained utilizing the ordered training samples. The trained neural network can receive an input of a second plurality of samples corresponding to human speech, where the second plurality of samples differs from the training samples. In response to receiving the second plurality of samples, the trained neural network can generate a plurality of phones corresponding to the captured human speech.

22 Claims, 9 Drawing Sheets

(56) References Cited

OTHER PUBLICATIONS

Chopra, Sumit, and Srinivas Bangalore. "Weakly supervised neural networks for Part-of-Speech tagging." Acoustics, Speech and Signal Processing (ICASSP), 2012 IEEE International Conference on. IEEE, 2012.*

Bengio, Yoshua, et al. "Curriculum learning." Proceedings of the 26th annual international conference on machine learning. ACM, 2009.*

Y. Bengio et al., "Curriculum Learning", Proceedings of the 26th Annual International Conference on Machine Learning (ICML 2009), pp. 41-48, Jun. 14, 2009, ACM, New York, NY.

Y. Bengio et al., "A Neural Probabilistic Language Model", Journal of Machine Learning Research, Feb. 2003, vol. 3, pp. 1137-1155.

C. Evers, "Connectionist Modeling and Education", Australian Journal of Education, Nov. 2000, vol. 44, No. 3, pp. 209-225.

Kmaclean, "What is the Different between a Monophone and a Triphone?", VoxForge.org Frequently Asked Questions, Jan. 3, 2010, available at http://www.voxforge.org/home/docs/faq/faq/what-is-the-different-between-a-monophone-and-a-triphone (last visited Apr. 9, 2013).

K. Krueger et al, "Flexible Shaping: How Learning in Small Steps Helps", Cognition, Mar. 2009, vol. 110, No. 3, pp. 380-394, Elsevier B.V.

L. Lamel et al., "Lightly Supervised Acoustic Model Training", Proceedings of 2001 IEEE International Conference on Acoustics, Speech, and Signal Processing (ICASSP '01), May 7, 2001, pp. 150-154, IEEE.

S. Sherrod, "Multilayer Perceptron Neural Networks", dtreg.com, available at http://www.dtreg.com/mlfn.htm (last visited Apr. 9, 2013).

* cited by examiner

Unordered Training Sample Pool P 310

| ID = S1 | ID = S2 | ID = S3 | ID = S4 | ID = S5 | ID = S6 | ID = S7 | ID = S8 |
|---|---|---|---|---|---|---|---|
| D = 10 | D = 15 | D = 5 | D = 5 | D = 10 | D = 10 | D = 10 | D = 10 |
| Q = 6 | Q = 7 | Q = 7 | Q = 4 | Q = 7 | Q = 5 | Q = 2 | Q = 9 |
| NN = 0.9 | NN = 0.99 | NN = 0.9 | NN = 0.25 | NN = 0.92 | NN = 0.83 | NN = 0.2 | NN = 0.96 |

Duration-Ordered Training Sample Pool OP1 320

| ID = S2 | ID = S1 | ID = S5 | ID = S6 | ID = S7 | ID = S8 | ID = S3 | ID = S4 |
|---|---|---|---|---|---|---|---|
| D = 15 | D = 10 | D = 10 | D = 10 | D = 10 | D = 10 | D = 5 | D = 5 |
| Q = 7 | Q = 6 | Q = 7 | Q = 5 | Q = 2 | Q = 9 | Q = 7 | Q = 4 |
| NN = 0.99 | NN = 0.9 | NN = 0.92 | NN = 0.83 | NN = 0.2 | NN = 0.96 | NN = 0.9 | NN = 0.25 |

Quality-Ordered Training Sample Pool OP2 330

| ID = S8 | ID = S2 | ID = S5 | ID = S3 | ID = S1 | ID = S6 | ID = S4 | ID = S7 |
|---|---|---|---|---|---|---|---|
| D = 10 | D = 15 | D = 10 | D = 5 | D = 10 | D = 10 | D = 5 | D = 10 |
| Q = 9 | Q = 7 | Q = 7 | Q = 7 | Q = 6 | Q = 5 | Q = 4 | Q = 2 |
| NN = 0.96 | NN = 0.99 | NN = 0.92 | NN = 0.9 | NN = 0.9 | NN = 0.83 | NN = 0.25 | NN = 0.2 |

D1-Ordered Training Sample Pool OP3 340, for $D1 = 1-((D+Q)/M1)$ and $M1 = 25$

| ID = S2 | ID = S8 | ID = S5 | ID = S1 | ID = S6 | ID = S3 | ID = S7 | ID = S4 |
|---|---|---|---|---|---|---|---|
| D = 15 | D = 10 | D = 10 | D = 10 | D = 10 | D = 5 | D = 10 | D = 5 |
| Q = 7 | Q = 9 | Q = 7 | Q = 6 | Q = 5 | Q = 7 | Q = 2 | Q = 4 |
| NN = 0.99 | NN = 0.96 | NN = 0.92 | NN = 0.9 | NN = 0.83 | NN = 0.9 | NN = 0.2 | NN = 0.25 |
| D1 = 0.12 | D1 = 0.24 | D1 = 0.32 | D1 = 0.36 | D1 = 0.4 | D1 = 0.52 | D1 = 0.52 | D1 = 0.64 |

FIGURE 3A

Prior-NN-Ordered Training Sample Pool OP4 350

| ID = S2<br>D = 15<br>Q = 7<br>NN = 0.99 | ID = S8<br>D = 10<br>Q = 9<br>NN = 0.96 | ID = S5<br>D = 10<br>Q = 7<br>NN = 0.92 | ID = S1<br>D = 10<br>Q = 6<br>NN = 0.9 | ID = S3<br>D = 5<br>Q = 7<br>NN = 0.9 | ID = S6<br>D = 10<br>Q = 5<br>NN = 0.83 | ID = S4<br>D = 5<br>Q = 4<br>NN = 0.25 | ID = S7<br>D = 10<br>Q = 2<br>NN = 0.2 |

Difficulty (D2)-Ordered Training Samples Pool OP5 360, for D2 = (M2−$f_{D2}$)/M2, M2 = 2, and $f_{D2}$ = NN + 0.04(D+Q)

| ID = S2<br>D = 15<br>Q = 7<br>NN = 0.99 | ID = S8<br>D = 10<br>Q = 9<br>NN = 0.96 | ID = S5<br>D = 10<br>Q = 7<br>NN = 0.92 | ID = S1<br>D = 10<br>Q = 6<br>NN = 0.9 | ID = S6<br>D = 10<br>Q = 5<br>NN = 0.83 | ID = S3<br>D = 5<br>Q = 7<br>NN = 0.9 | ID = S7<br>D = 10<br>Q = 2<br>NN = 0.2 | ID = S4<br>D = 5<br>Q = 4<br>NN = 0.25 |
| $f_{D2}$ = 1.87<br>D2 = 0.065 | $f_{D2}$ = 1.72<br>D2 = 0.14 | $f_{D2}$ = 1.6<br>D2 = 0.2 | $f_{D2}$ = 1.54<br>D2 = 0.23 | $f_{D2}$ = 1.43<br>D2 = 0.285 | $f_{D2}$ = 1.38<br>D2 = 0.31 | $f_{D2}$ = 0.68<br>D2 = 0.66 | $f_{D2}$ = 0.61<br>D2 = 0.695 |

D2-Ordered and Historically-Weighted Training Sample Pool OP6 370

| ID = S2<br>D = 15<br>Q = 7<br>NN = 0.99 | ID = S8<br>D = 10<br>Q = 9<br>NN = 0.96 | ID = S5<br>D = 10<br>Q = 7<br>NN = 0.92 | ID = S1<br>D = 10<br>Q = 6<br>NN = 0.9 | ID = S6<br>D = 10<br>Q = 5<br>NN = 0.83 | ID = S3<br>D = 5<br>Q = 7<br>NN = 0.9 | ID = S7<br>D = 10<br>Q = 2<br>NN = 0.2 | ID = S4<br>D = 5<br>Q = 4<br>NN = 0.25 |
| $f_{D2}$ = 1.87<br>D2 = 0.065<br>H(s) = 0<br>h() = 0.065<br>O = Succ | $f_{D2}$ = 1.72<br>D2 = 0.14<br>H(s) = −0.01<br>h() = 0.13<br>O = Succ | $f_{D2}$ = 1.6<br>D2 = 0.2<br>H(s) = −0.02<br>h() = 0.18<br>O = Fail | $f_{D2}$ = 1.54<br>D2 = 0.23<br>H(s) = −0.01<br>h() = 0.22<br>O = Succ | $f_{D2}$ = 1.43<br>D2 = 0.285<br>H(s) = −0.02<br>h() = 0.265<br>O = Succ | $f_{D2}$ = 1.38<br>D2 = 0.31<br>H(s) = −0.03<br>h() = 0.28<br>O = Fail | $f_{D2}$ = 0.68<br>D2 = 0.66<br>H(s) = −0.02<br>h() = 0.64<br>O = Succ | $f_{D2}$ = 0.61<br>D2 = 0.695<br>H(s) = −0.03<br>h() = 0.665<br>O = Fail |

FIGURE 3B

CURRICULUM LEARNING FOR SPEECH RECOGNITION

CROSS-REFERENCE TO RELATED APPLICATIONS

This application claims priority to U.S. Patent Application No. 61/715,777, filed Oct. 18, 2012, entitled "Curriculum Learning for Speech Recognition", which is fully incorporated by reference herein for all purposes.

BACKGROUND

Unless otherwise indicated herein, the materials described in this section are not prior art to the claims in this application and are not admitted to be prior art by inclusion in this section.

Computerized speech recognition can be broken down into a series of procedures. One procedure is to convert a stream of "acoustic features", or sampled and filtered speech data, to a stream of phonemes, which are then recognized as words.

Each acoustic feature can represent one or more samples of speech. For example, a fixed duration of speech can be sampled at fixed intervals of time; e.g. every 10-30 milliseconds. The sample can be transformed into a set of mel-frequency centered cepstral coefficients (MFCC) using well-known techniques. The set of MFCC coefficients corresponding to one sample of speech can be considered to be one acoustic feature.

The acoustic features can be provided to a neural network for derivation of probability models of speech corresponding to the features. Once trained, the neural network can take later acoustic features as input, recognize the acoustic features as spoken speech, and generate text and/or audible output(s) corresponding to the recognized spoken speech.

The current state-of-the-art involves training neural networks with a Stochastic Gradient Descent (SGD) procedure. SGD involves presentation of small batches of training samples to a neural network being trained, and updating the probability models in response to a gradient derived from the error made when comparing the neural network's output to a target output. After a first batch of training samples are presented to the neural network, the first batch are placed back in a pool of training samples, and the pool is resampled to get a second batch of training sample for presentation to the neural network. In some scenarios, the first and second batch can include some or all of the same training samples.

Using SGD to train a neural network can involve presentation of billions of samples of speech multiple times, and can take a long time even with parallelized processing and/or using fast processors. Additionally, SGD and other gradient methods risk getting stuck into "local optima" which can result in degraded accuracy compared to other solutions that could be achieved.

SUMMARY

In one aspect of the disclosure of the application, a computing device receives training samples for training a neural network to learn an acoustic speech model. A curriculum function for acoustic speech modeling is determined. For each training sample of the training samples, a corresponding curriculum function value for the training sample is determined using the curriculum function. The training samples are ordered based on the corresponding curriculum function values for the training samples. The computing device outputs the ordered training samples.

In another aspect of the disclosure of the application, a computing device receives a plurality of training samples for training a neural network to learn an acoustic speech model. The computing device determines an ordering of a plurality of tasks for training the neural network to learn the acoustic speech model, with the ordering based on task difficulty. For each task in the ordered plurality of tasks, the computing device: selects one or more training samples from the plurality of training samples for the task, and teaches the task to the neural network by presenting the selected one or more training samples to the neural network.

In yet another aspect of the disclosure of the application, a computing device is provided. The computing device includes a processor and a computer-readable storage medium. The computer-readable storage medium stores thereon program instructions that, upon execution by the processor, cause the computing device to perform operations. The operations include: (i) receiving training samples for training a neural network to learn an acoustic speech model, (ii) determining a curriculum function for acoustic speech modeling, (iii) for each training sample of the training samples, determining a corresponding curriculum function value for the training sample using the curriculum function, (iv) ordering the training samples based on the corresponding curriculum function values for the training samples, and (v) outputting the ordered training samples.

In even another aspect of the disclosure of the application, an article of manufacture is provided. The article of manufacture includes a computer-readable storage medium having stored thereon program instructions. The program instructions, upon execution by a computing device, cause the computing device to perform operations. The operations include: (i) receiving training samples for training a neural network to learn an acoustic speech model, (ii) determining a curriculum function for acoustic speech modeling, (iii) for each training sample of the training samples, determining a corresponding curriculum function value for the training sample using the curriculum function, (iv) ordering the training samples based on the corresponding curriculum function values for the training samples, and (v) outputting the ordered training samples.

BRIEF DESCRIPTION OF THE FIGURES

FIGS. 3A and 3B show example pools of training samples, in accordance with example embodiments.

DETAILED DESCRIPTION

Overview

Figure 1A:
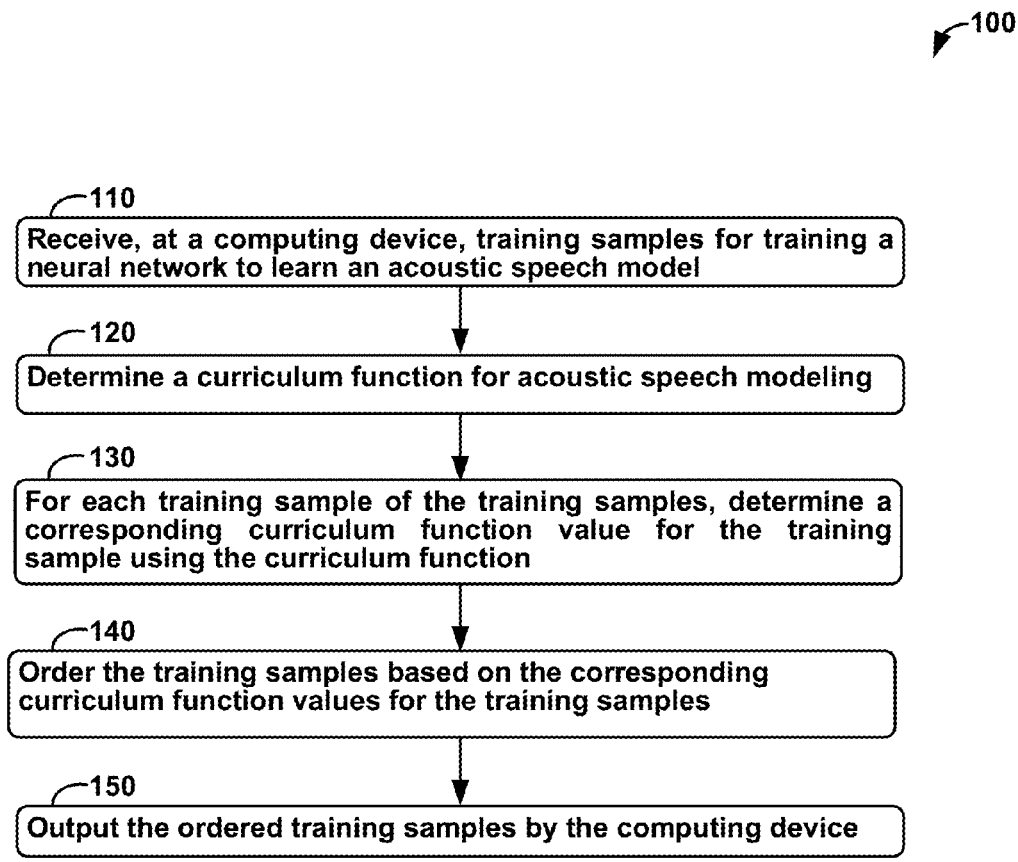
FIG. 1A is a flow chart of a method, in accordance with an example embodiment.

Devices, software and techniques are described herein based on the principles of "curriculum learning" for training a neural network to be adapted to the domain of acoustic models for speech recognition. The disclosed curriculum learning techniques involve presenting training samples to the neural network in a particular order, for example, with easier samples first and more difficult samples later. Two example techniques for ordering inputs to a neural network based on difficulty include: (1) ordering input samples related to progressively more difficult tasks and (2) order input samples related to progressively more difficult samples.

As an example of ordering input samples based on progressively more difficult tasks, there are about 40 context-independent phones, or basic sounds, commonly used in spoken English. To make larger blocks of speech, these phones can be grouped into context-dependent "triphones", which is a group of three phones: a left "L" phone that precedes a central "X" phone that in turn precedes a right "R" phone. In one dictionary, approximately 6,000 triphones were found for about 130,000 word pronunciations. Therefore, it may be easier to identify one phone from a list of 40 or so phones than to identify one triphone out of a list of 6,000 (or more) triphones.

Once the phones are learned by the neural network, the neural network can be trained in phases using the context-independent phones and context-dependent triphones. For example, triphones can be associated with one or more trees that have a large number of context dependent nodes, starting with a root node that distinguishes a very basic context; e.g., "Is this the first word of a sentence?" The tree(s) can end with a large number of leaf nodes that distinguish specific contexts, such as identifying a specific triphone. These trees can be truncated below the root node as needed, such as at a low level for a relatively small group of context dependent states or a high level for a relatively large group of context dependent states. As the neural network learns, the truncation of the tree can occur at increasingly higher levels. A sequence of increasingly higher-level truncations can lead to a corresponding sequence of increasingly larger contexts, and thus increasingly larger groups of triphones, as part of a curriculum learning program.

As an example of ordering input samples based on progressively more difficult samples, the better the sound quality of the sample, the easier that a neural network can learn speech in the sample. Based on this observation, initial sound samples provided to a neural network can be recorded under excellent conditions, such as in a sound studio. In later examples, the sound samples might have a considerable amount of noise.

Sounds with similar characteristics can be grouped together and presented to the neural network as a group. For example, a group of fricative sounds, or sounds for consonants produced by forcing air through a constricted vocal passage, such as sounds for the letters "f", "s", and "z", can be presented to the neural network. Then, once the neural network is trained on fricative sounds, a group of plosive sounds, or sounds for consonants produced by closing the vocal passage and subsequently releasing a burst of air, such as sounds for the letters "b", "d", and "p", can be presented to the neural network.

After a first neural network is trained, the trained neural network can be configured to produce probability values for recognizing samples of speech, including samples used to train other neural networks. For example, given a pool of training samples P, the trained neural network can process each training sample in P, and determine the corresponding speech sub-unit(s) or unit(s) for the training sample along with a probability that the trained neural network correctly determined the speech. A high probability of recognition can indicate that the trained neural network found the sample relatively easy to recognize, while a low probability of recognition can indicate that the trained neural network found the sample relatively difficult to recognize. Thus, as part of curriculum training process, previous probability data, perhaps generated by a trained neural network, can be used to order a set of training samples in accordance with curriculum learning principles to move from easier to more difficult samples.

Combinations of these measures can also be used; e.g., a curriculum function that generates values based on previous probabilities and speech qualities as input can be determined. The samples can be sorted by values of this curriculum function to order the training samples so the neural network is first presented with easier samples; i.e., samples with higher probabilities and higher speech quality values; and then with more difficult examples later; i.e., samples with lower probabilities and/or lower speech quality values.

These techniques can improve training speed of neural network involved in speech recognition. Also, the herein-described techniques can improve the likelihood of arriving at better local optima than current techniques, and perhaps arriving at a global optimum.

Example Operations

FIG. 1A is a flow chart of an example method 100 in accordance with an example embodiment. At block 110, a computing device can receive training samples for training a neural network to learn an acoustic speech model. In some embodiments, at least one training sample represents a phone of captured speech. In still other embodiments, at least one training sample represents a triphone of captured speech.

At block 120, a curriculum function for acoustic speech modeling can be determined. In some embodiments, the curriculum function can include at least one function selected from a group consisting of a duration function, a sound quality function, a posteriori estimator function, and a previously trained neural network.

At block 130, for each training sample of the training samples, a corresponding curriculum function value for the training sample can be determined using the curriculum function. In some embodiments, the curriculum function value for a training sample can correspond to a difficulty value that the neural network has in processing the training sample. A sample corresponding to a lower difficulty value can be less difficult for the neural network to process than a sample corresponding to a higher difficulty value.

At block 140, the computing device can order the training samples based on the corresponding curriculum function values for the training samples. In some embodiments, ordering the training samples based on the corresponding curriculum function values for the training samples can include ordering the training samples so that training samples corresponding to lower difficulty values are presented to the neural network before samples corresponding to higher difficulty values.

At block 150, the computing device can output the ordered training samples. In some embodiments, method 100 can include training the neural network utilizing the output ordered training samples. A second plurality of samples can be received as an input to the trained neural network. At least some samples in the second plurality of samples differ from the training samples. In response to receiving the second plurality of samples, the trained neural network can generate a plurality of phones corresponding to the captured human speech.

Figure 1B:
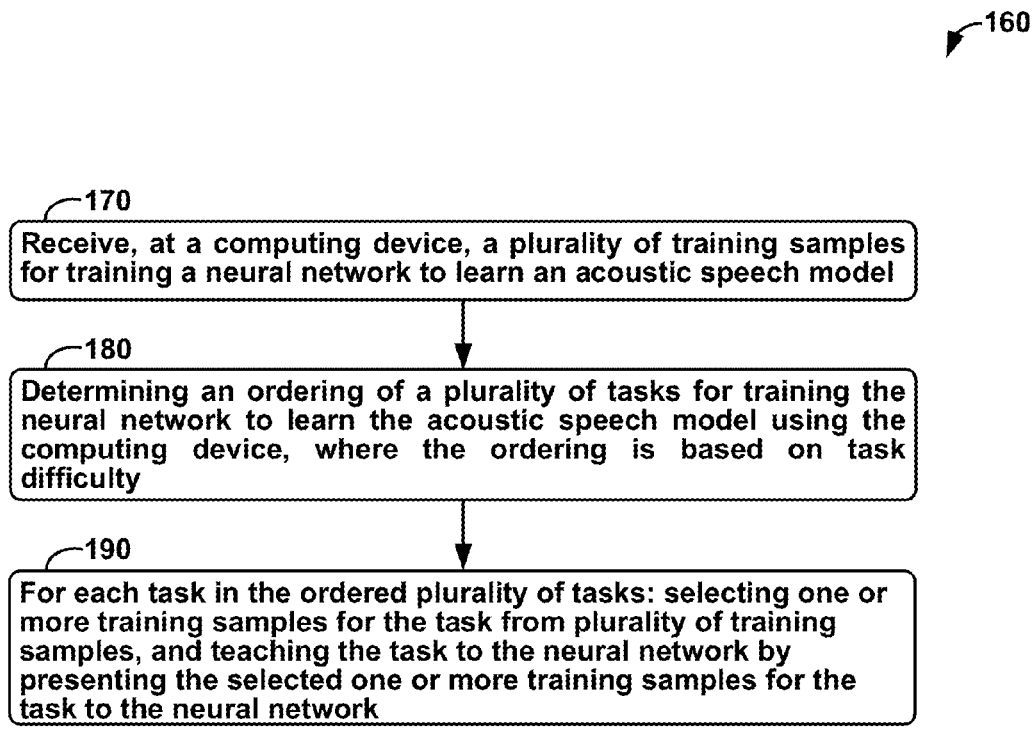
FIG. 1B is a flow chart of another method, in accordance with an example embodiment.

FIG. 1B is a flow chart of an example method 160 in accordance with an example embodiment. At block 170, a computing device can receive a plurality of training samples for training a neural network to learn an acoustic speech model. In some embodiments, the plurality of tasks can include: a task associated with phones, and a task associated with context independent sounds, and a task associated with context-dependent sounds.

At block 180, the computing device can determine an ordering of the plurality of tasks for training the neural network to learn the acoustic speech model, where the ordering is based on task difficulty. In some embodiments, determining the ordering of the plurality of tasks by difficulty can include: determining a number of outputs for each task in the plurality of tasks, and ordering the plurality of tasks based on the plurality of numbers of outputs. In particular embodiments, the task hierarchy has a plurality of levels, such that a task T1 at a specified level L1 of the task hierarchy is less difficult than each task at a level L2, where the level L2 is below the specified level L1 in the task hierarchy, such as discussed below in the context of at least FIGS. 4A and 4B.

At block 190, for each task in the ordered plurality of tasks, the computing device can: select one or more training samples from the plurality of training samples for the task, and teach the task to the neural network by presenting the selected one or more training samples to the neural network. In some embodiments, selecting the one or more training samples can include selecting all of the plurality of training samples as the one or more training samples.

Applications of Curriculum Learning Techniques for Speech Recognition

Figure 2:
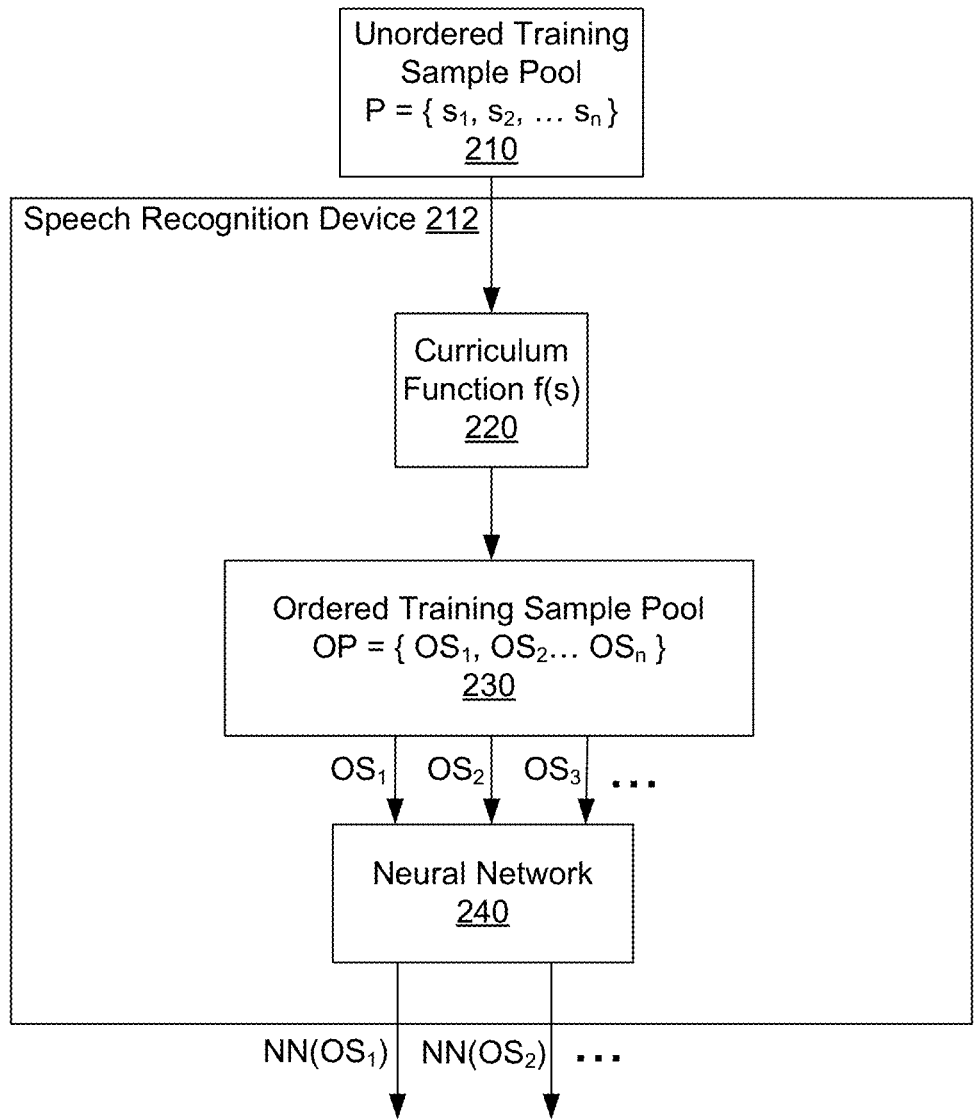
FIG. 2 shows an example procedure for training a neural network of a speech recognition device using a pre-determined pool of training samples based on curriculum learning techniques, in accordance with an example embodiment.

FIG. 2 shows an example procedure for training a neural network 240 of a speech recognition device 212 using an unordered pool of training samples 210 based on curriculum learning techniques, in accordance with an example embodiment. The pool of training samples 210 can include samples of (human) speech. For example, a sample could correspond to one or more captured sentences, phrases, words, phones, triphones, and/or frames. A frame is a short (e.g., 5-20 milliseconds) segment of captured audio, which can include spoken human speech or silence.

Each training sample of the pool of training samples 210 can be provided to a curriculum function 220, shown in FIG. 2 as f(s). In some embodiments, curriculum function f( ) 220 takes as an input sample s and generates a difficulty score f(s) for the sample. In some embodiments, curriculum function 220 can take multiple inputs; e.g., a type of task related to the sample, multiple samples, and/or other types of inputs. The output curriculum value f(s) can be determined such that if a curriculum value for a first sample $s_1$ is less than a curriculum value for a second sample $s_2$; e.g., if $f(s_1) < f(s_2)$, then sample $s_1$ can be determined to be less difficult for neural network 240 to process than sample $s_2$.

In other embodiments, the difficulty score can be determined such that sample $s_1$ is determined to be more difficult than sample $s_2$ when curriculum value $f(s_1)$ is less than curriculum value $f(s_2)$. That is, in these other embodiments, when $f(s_1) < f(s_2)$, then sample $s_1$ can determined to be more difficult for neural network 240 to process than sample $s_2$.

In cases where the samples are chosen based on the difficulty of a task, the type of task can be used to order the difficulty of samples. For example, the English language has about 40 "phones" or basic parts of speech. Thus, given a sample phone, an untrained neural network has about 1 in 40 chance of accurately classifying the sample phone. Each phone can be divided into three "triphones"—a first, middle, and last triphone. There are $40^3 = 64,000$ possible arrangements of triphones, and therefore the same untrained neural network has about 1 in 64,000 chance of accurately classifying a sample triphone. Based on these probabilities, the "phone recognition" task is likely to be less difficult than the "triphone recognition" task. As such, the curriculum function can select samples for the phone recognition task first and later select samples for the triphone recognition task.

In some embodiments where the samples are chosen based on the difficulty of a task, a curriculum function is not used; rather, the types of tasks presented to the neural network get more difficult a priori, such as the phone recognition and triphone recognition example above. In some embodiments where the samples are chosen based on the difficulty of a task, a curriculum function can be used to order samples of a given type of task; e.g., to order samples for the phone recognition task from less difficult to more difficult.

In cases where the curriculum function concentrates on choosing samples based on the difficulty of the sample, a number of curriculum functions are described herein for training neural networks to learn acoustic models for speech recognition. One curriculum function is based on frame duration, as generally speaking, longer samples are easier to process than shorter samples. Another curriculum function is speech quality, such as a signal-to-noise ratio (SNR) value for the speech sample. The SNR ratio, often expressed in decibels, is a ratio of sound signal strength in the sample to noise present in the sample. In some embodiments, SNR values can range from $SNR_{min} = -40$ dB (very poor sound quality) to $SNR_{max} = 40$ dB (very good sound quality).

In other embodiments, $SNR_{min}$ and/or $SNR_{max}$ can take on other values. An input value SNR $SNR_{in}$ in the range of $[SNR_{min}, SNR_{max}]$ can be converted to a scaled SNR value $SNR_{SC}$ in the range of 1 to 10 scale; e.g., $SNR_{SC} = 9*((SNR_{in} - SNR_{min})/(SNR_{max} - SNR_{min})) + 1$. Other techniques for determining speech quality, such as a human rating of speech quality, native vs. non-native speaker information, speaker age (where middle aged speakers are generally easier to understand than either very young or very old speakers); can be used as well or instead.

Posterior estimators or statistical estimation techniques that can make a point estimate based on previously-seen data, can be used as curriculum functions to estimate difficulty of a sample.

A previously trained neural network (NN) can be used as a curriculum function to classify difficulty of the training sample. In some embodiments, the previously-trained neural network can provide a probability NNp(s), $0 \leq NNp \leq 1$, that a training sample s is correctly classified. Then, the complement c(NNp), where c(NNp)=1-NNp can be used as a curriculum function. For example, suppose the previously-trained neural network can classify a training sample $s_t$ with a probability $NNp(s_t)$ of 0.9. Then, $c(NNp(s_t))=1-NNp(s_t)=1-0.9=0.1$, can be used to indicate that the training sample has a difficulty of 0.1.

Once curriculum function 220 is determined, a value of curriculum function 220 for each training sample 210 can be determined. Training sample pool OP 230 then can be ordered based on the curriculum function values of the training samples.

For example, let P be a pool of n training samples, with $P = \{s_1, s_2, \ldots s_n\}$, let f(s) be a determined curriculum function where $f(s_1) < f(s_2)$ in the case that $s_1$ is less difficult for neural network processing than $s_2$, and where $s_1, s_2 \in P$. Then, let OP 230 be an ordered pool of training samples, where OP 230 includes the n samples of pool P as ordered by the determined curriculum function. Specifically, let OP 230={$OS_1$, $OS_2, \ldots OS_n$}, where $f(OS_1) \leq f(OS_2) \leq \ldots \leq f(OS_n)$, and where each of $OS_1, OS_2, \ldots OS_n$ is a training sample selected from P. With this ordering of samples in OP 230, $OS_1$ is less difficult than $OS_2$, which in turn is less difficult than $OS_3$, and so on, until reaching $OS_n$, which is the most difficult sample according to the curriculum function values f(s).

In other embodiments, $f(s_1) > f(s_2)$ implies that sample $s_1$ is less difficult than sample $s_2$. Then in these other embodiments, OP 230={$OS_1, OS_2, \ldots, OS_n$}, where $f(OS_1) \geq f(OS_2) \geq \ldots \geq (OS_n)$, and where each of $OS_1, OS_2, \ldots, OS_n$ is a training sample selected from P. With this ordering of samples in OP 230, $OS_1$ is less difficult than $OS_2$, which in turn is less difficult than $OS_3$, and so on, until reaching $OS_n$, which is the most difficult sample according to the curriculum function values f(s).

To train neural network 240, each sample OS in the ordered pool OP 230 can be provided to neural network 240 in order of increasing difficulty. That is, neural network 240 first receives and processes sample $OS_1$, the easiest sample, to generate neural network output $NN(OS_1)$. Then, neural network 240 receives and processes sample $OS_2$, the second easiest sample, to generate neural network output NN ($OS_2$) and so on until neural network 240 receives and processes sample $OS_n$, the hardest sample, to generate neural network output $NN(OS_n)$.

FIGS. 3A and 3B show example pools of training samples, in accordance with example embodiments. FIG. 3A shows unordered training pool P 310 having eight samples. Each sample in pool 310 has an identifier (ID) from S1 through S8, a duration value (D) for the sample measured in milliseconds with D ranging from 5 to 15, a quality value (Q) for the sample ranging from 1 to 10, and a previously-trained neural network probability value (NN) ranging from 0 to 1. Each quality Q value shown in FIGS. 3A and 3B can be based on scaled SNR values and/or other measures of sample sound quality. In other examples not shown in the Figures, the IDs, D, Q, and/or NN values can be different and/or some or all of these values can be in different ranges. For example, FIG. 3A shows that pool P 310 has a sample with ID=S4 having a duration (D) of 5 milliseconds, a quality value (Q) of 4 on a 1-10 scale, and a previously-trained neural network probability value (NN) of 0.25.

FIG. 3A shows an ordered training sample pool OP1 320, whose samples are ordered by duration values. OP1 can utilize a curriculum function $f_D(s)=D(s)$, where D(s) returns a duration value D for the sample. Longer samples are generally considered to be less difficult. Thus, if $f_D(s_1) > f_D(s_2)$, $s_1$ is likely to be less difficult than $s_2$. To arrange samples in increasing difficulty, $f_D(\ )$ can arrange a pool of samples in order of decreasing duration, with longest duration samples presented to neural network 240 first, and shorter duration samples after the longest duration samples, until the shortest duration samples are presented to neural network 240.

FIG. 3A shows that samples with the same duration in pool OP1 are then shown in "identifier order"; e.g., S1, S2, S3, ... S8. Then, the samples in OP1 320, as shown in FIG. 3A, as ordered using $f_D(s)$ are S2 with duration 15; S1, S5, S6, S7, and S8, each with duration 10; and S3 and S4 with duration 5. In other embodiments, other criteria other than or in addition to identifier order for ordering samples having the same duration can be used.

FIG. 3A shows an ordered training sample pool OP2 330, whose samples are ordered by quality values. OP2 can utilize a curriculum function $f_Q(s)=Q(s)$, where Q(s) returns a quality value Q for the sample. Higher-quality samples are generally considered to be less difficult. Thus, if $f_Q(s_1) > f_Q(s_2)$, $s_1$ is likely to be less difficult than $s_2$. To arrange samples in increasing difficulty, $f_Q(\ )$ can arrange a pool of samples in order of decreasing quality, with highest-quality samples presented to neural network 240 first, and lesser-quality samples after the highest-quality samples, until the lowest-quality samples are presented to neural network 240.

FIG. 3A shows that samples with the same quality in pool OP2 are then shown in identifier order. Then, the samples in OP2 330, as shown in FIG. 3A, as ordered using $f_Q(s)$ are S8 with a quality value Q of 9; S2, S3, and S5 each with Q=7; S1 with Q=6; S6 with Q=5; S4 with Q=4, and S7 with Q=2. In other embodiments, other criteria other than or in addition to identifier order for ordering samples having the same quality can be used.

Curriculum functions combining values of training samples can be used. As indicated above difficulty of a sample S generally decreases as both sample duration D and sample quality Q increase, and thus the difficulty of the sample S decreases as D+Q increases. Therefore, the sum D+Q can be used in a combination curriculum function.

FIG. 3A shows ordered a training sample pool OP3 340, whose samples are ordered using a curriculum function D1 combining quality and duration values, where D1=1−((D+Q)/M1), with M1=25. For the samples of pool P 310, duration values range from 5 to 15 and quality values range from 1 to 10. Therefore, the sum of duration and quality values D+Q could range from 2 to 25 and the value (D+Q)/25 ranges from 2/25 to 1. Further, the value D1=1−((D+Q)/M1)) could range from 0, when D+Q equals the maximum value 25, to 23/25 when D+Q equals the minimum value of 2. More generally, D1 decreases as D+Q increases and D1 increases as D+Q decreases. Then, let D1(s)=1−((D(s)+Q(s))/M1). D1(s) decreases as D(s)+Q(s) increases, and so ordering training samples by increasing D1 (or D1(s)) values leads to ordering training samples by increasing difficulty.

FIG. 3A shows samples in ordered training sample pool OP3 340 ordered in increasing order of D1 values. FIG. 3A shows a D1 value for a sample below the corresponding sample. For example, sample S2, which is the first sample in OP3, has a lowest D1 value of 1−((15+7)/25)=1−22/25=3/25 or 0.12, as shown in FIG. 3A. Similarly, sample S8, the second sample in OP3 340 has a second-lowest D1 value of 0.24; the third sample S5 in OP3 340 has a third-lowest D1 value of 0.32; and so on, until considering sample S4, the last sample in OP3 340, which has a highest D1 value of 0.64.

As mentioned above, probability values from a previously-trained neural network operating on the training sample can be used in a curriculum function. For example, under the assumption that a higher probability from a previously-trained neural network is indicative of an easier sample for training, then samples can be organized in order of decreasing previously-trained neural network probabilities, or NN values. Then to order ordered training sample pool OP4 350, a curriculum function f(s) can be utilized, where f(s)=NN(s) with NN(s) returning a previously-trained neural network probability NN for the sample s. Samples with higher previously-trained neural network probabilities are generally considered to be less difficult. Thus, if $f_{NN}(s_1) > f_{NN}(s_2)$, sample $s_1$ is likely to be less difficult than sample $s_2$.

FIG. 3B shows samples in ordered training sample pool OP4 350 ordered in decreasing order of NN values, and thus in increasing order of difficulty. For example, sample S2, which is the first sample in OP4 350, has a highest NN value of 0.99, as shown in FIG. 3B. Then, sample S8, the second sample in OP4 350, has a second-highest NN value of 0.96; the third sample S5 in OP4 350 has a third-highest NN value of 0.92, and so on, until sample S7, the last sample in OP4 350, has a lowest NN value of 0.2.

Curriculum functions combining duration, quality, and probabilities can be used in ordering training sample pools as well. FIG. 3B shows a D2-ordered training sample pool OP5 360, in which samples are arranged by a curriculum function D2. As shown in FIG. 3B, D2=(M2-$f_{D2}$)/M2, with M2=2, and $f_{D2}$=NN+0.04(D+Q). As mentioned above, the sum N+Q ranges from 2 to 25 for the samples in pool P 310, which implies that the values of the sub-expression 0.04(D+Q) could range from 0.08 to 1. Being probabilities, the NN values range from 0 to 1. Taking these ranges into account, the possible ranges for $f_{D2}$=NN+0.04(D+Q)=[0, 1]+[0.08, 1]= [0.08, 2]. Based on this analysis, M2, which is the maximum value for $f_{D2}$, can be set to 2. Thus, a range of D2=(2-[0.08, 2])/2=[0, 1.92]/2=[0, 0.96]; that is, D2 could range from 0 to 0.96.

As also mentioned above, the difficulty of a sample s decreases as D(s), Q(s), and NN(s) increase. This implies that the difficulty of a sample (s) decreases as $f_{D2}$(s)=NN(s)+0.04 (D(s)+Q(s)) increases, as each of the D(s), Q(s), and NN(s) terms in $f_{D2}$(s) have positive coefficients. Further, as $f_{D2}$(s) increases, D2(s) decreases, as D2(s)=(M2-$f_{D2}$(s))/M2 has one $f_{D2}$(s) term with a negative coefficient. Therefore, a difficulty of a sample s should decrease as D2(s) decreases, and conversely, the difficulty of sample s should increase as D2(s) increases. By presenting samples with monotonically increasing D2 values to a neural network, the neural network can be trained with samples of monotonically increasing difficulties.

FIG. 3B shows D2-ordered training samples pool OP5 360 with samples of pool P ordered by increasing D2 values, and thus in increasing order of difficulty. FIG. 3B shows, below each sample, both $f_{D2}$ and D2 values for the sample. For example, sample S2, which is the first sample in OP5 360, has a lowest D2 value of 0.065 and corresponding $f_{D2}$ value of 1.87, as shown in FIG. 3B. Then, sample S8, the second sample in OP5 360, has a second-lowest D2 value of 0.14 and corresponding $f_{D2}$ value of 1.72. S5, shown in FIG. 3B the third sample in OP4 350 has a third-lowest D2 value of 1.6 and corresponding $f_{D2}$ value of 0.2, and so on, until sample S4, the last sample in OP5 350, has a highest D2 value of 0.695 and corresponding $f_{D2}$ value of 0.61.

The curriculum function can be modified by behavior of the neural network being trained. For example, if the neural network erred in classifying the previous training sample $s_p$, the curriculum function f($s_p$) can be increased to indicate that the neural network had some difficulty with the previous training sample. More generally, a historical curriculum function h(f, s, H, Min, Max) can calculate a difficulty value using curriculum function f(s) that produces values between Min and Max when applied to training sample s and then modify the difficulty value based on a historical weighting value H(s); e.g., $$h(f, s, H, Min, Max) = \begin{cases} Min, & \text{when } f(s) + H(s) < Min \\ f(s) + H(s), & \text{when } f(s) + H(s) \in [Min, Max] \\ Max, & \text{when } f(s) + H(s) > Max \end{cases}$$

H(s) can be set initially to 0, can be decreased by an amount of decrease each time the neural network accurately classifies a training sample s, and can be increased by an amount of increase each time the neural network inaccurately classifies training sample s. That is, when the neural network gets the sample right, the historical difficulty of the training set H(s) can be decreased. On the other hand, when the neural network gets the sample wrong, the historical difficulty of the training set H(s) can be increased.

The amount of increase may be the same or may differ from the amount of decrease; e.g., let AI be the amount of increase and AD be the amount of decrease. Then, as one example that equally weights successes and failures AI=AD=0.01. As another example that weights failures more heavily that successes, AI=0.02, and AD=0.01. Many other examples are possible as well, including changing amounts of increase and/or decrease over time.

FIG. 3B shows an example of historical weighting used in processing a D2-ordered and historically-weighted training sample pool OP6 370. Initially, OP6 370 is ordered using the D2 function discussed above in the context of ordered training sample pool OP5 360. Then, as a neural network processes each samples in OP6 370 and subsequently generates an outcome O of either "Succ" for success, or "Fail" for failure. In the example shown in FIG. 3B, successes lead to a decrease of the above-mentioned H(s) function by an AD amount of 0.01, and failures lead to an increase of the H(s) function by an AI amount of 0.01.

FIG. 3B shows that prior to processing S2, the first sample in OP6 370, H(s) is set to 0. Then, FIG. 3B shows that S2 is processed successfully with the "O=Succ" notation under sample S2 of OP6 370. Then, after processing S2, H(s) can be decreased by AD, so that H(s)=-0.01, after processing sample S2 but before processing S8 of OP6 370. Then, for S8, the curriculum function value D2(S8)=0.14 can be adjusted by the historical weighting value H(s)=-0.01, to lead to a historically-weighted curriculum function value h(f, s, H, Min, Max)=0.13 (shown in FIG. 3B as h( )).

FIG. 3B shows that sample S8, the second sample of OP6 370, is also processed successfully by the neural network, and H(s) for the next sample, S5, is decreased to -0.02. As D2(S5)=0.2, the corresponding h( ) value is 0.18, as shown in FIG. 3B. FIG. 3B shows that sample S5, the third sample of OP6 370, is processed unsuccessfully by the neural network, and H(s) for the next sample, S1, is increased to -0.01. FIG. 3B shows success/failure outcomes, and resulting H(s) and h( ) values, for all samples in pool OP6 370.

In other embodiments, some or all of these example curricula functions be used in combination; e.g., ordering the training samples by sound quality throughout the duration of a training session. Then, the training session can be divided that training into stages with successively more difficult classification problems. The difficulty measure could be a combination of curriculum functions that include posterior estimators and probabilities generated by previously trained neural networks. Many other examples are possible as well.

Example Task Hierarchies and Neural Networks

Figure 4A:
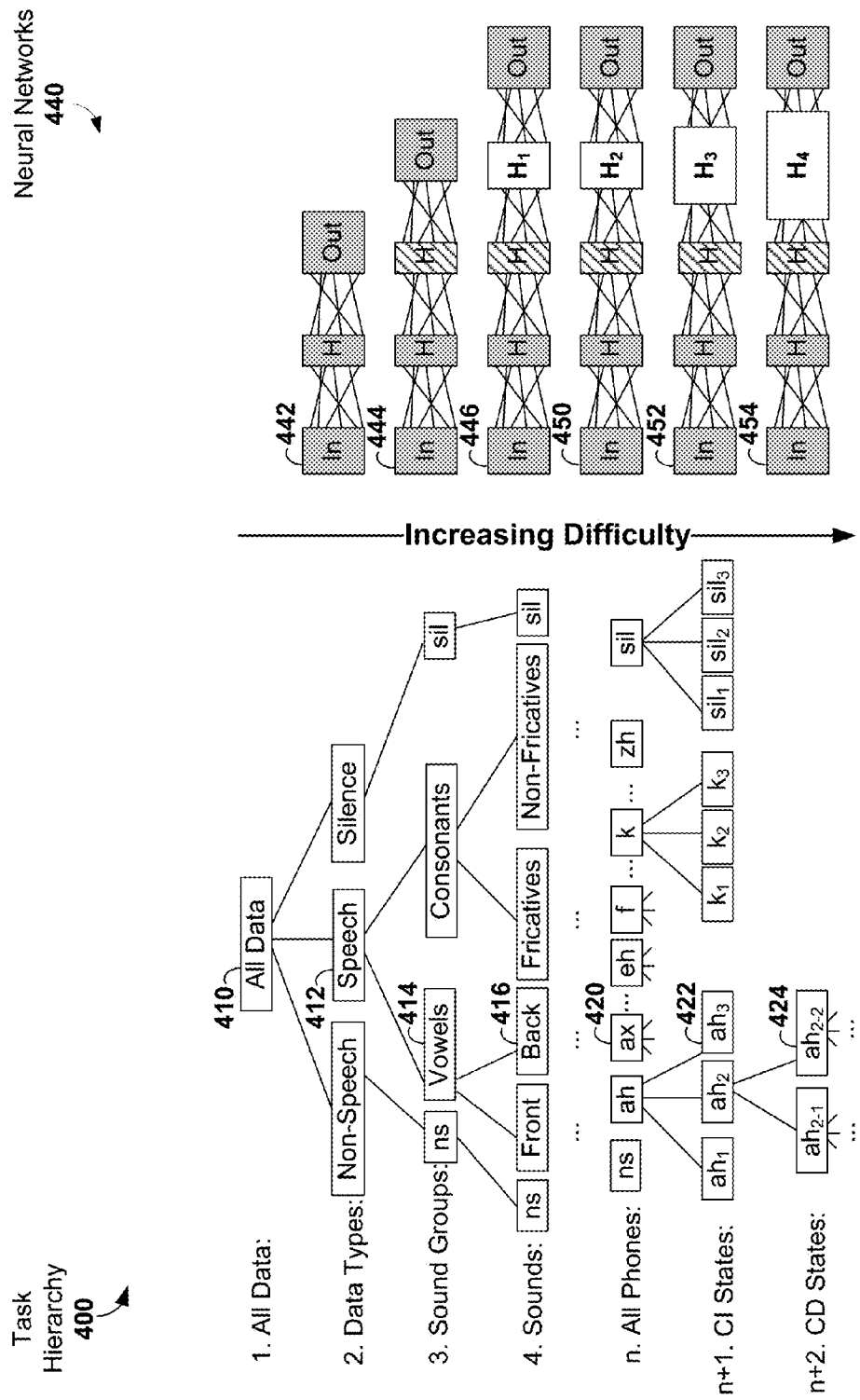
FIG. 4A shows an example task hierarchy and set of neural networks, in accordance with example embodiments.

FIG. 4A shows a task hierarchy 400 and set of neural networks 440, in accordance with example embodiments. As mentioned above, input samples can be ordered based on progressively more difficult tasks. Phonetic states can be generated using a tree-based approach, such as shown in task hierarchy 400. The topmost "All Data" task layer 410 can recognize "All Data" and then distinguish between "Non-Speech", "Speech" and "Silence" types of data. Each type of data distinguished at task layer 410 becomes a separate task at a next task layer below, shown in FIG. 4A as a "Data Types" layer 412. In some embodiments, task hierarchy 400 can have more, fewer, and/or different task layers than shown in FIG. 4.

FIG. 4A shows task layer 412 having the "Non-Speech", "Speech", and "Silence" tasks, with sub-tasks shown for the "Speech" and "Silence" tasks. In some embodiments, task hierarchy 400 can include sub-tasks for some or all tasks shown without sub-tasks; e.g., task hierarchy 400 can include sub-tasks for the "Non-Speech" task of task layer 412, and/or more, less, and/or different tasks at each task layer of task hierarchy 400.

FIG. 4A shows that the "Non-Speech" task of task layer 412 has a "ns" sub-task at "Sound Groups" task layer 414, the "Speech" task at task layer 412 has sub-tasks of "Vowels" and "Consonants" shown at "Sound Groups" task layer 414 and that the "Silence" task at task layer 412 has a "sil" sub-task at "Sound Groups" task layer 414 of task hierarchy 400. Thus, tasks at a non-leaf layer of task hierarchy 400; i.e., a layer that has sub-tasks, can have sub-tasks at one or more task layers below the non-leaf layer. In some embodiments, tasks at a non-leaf layer can have sub-tasks only at the layer immediately below the non-leaf layer, while in other embodiments, tasks at a non-leaf layer can have sub-tasks that are not directly below the non-leaf layer; e.g., the task can skip one or more layers to relate to the sub-task.

As shown in FIG. 4A, task hierarchy 400 continues down from the "Sound Groups" task layer 414, through "Sounds" task layer 416, "All Phones" task layer 420, context independent (CI) states task layer 422, context dependent (CD) states task layer 424, to a "Finer CD States" task-layer 430, which can be a leaf layer; i.e., a layer without sub-tasks.

Each task layer in task hierarchy 400 can be ordered from top to bottom, with the top most "All Data Task" task layer 410 numbered 1, the second topmost "Data Types" task layer 412 being numbered 2, and so on until reaching the bottom most "Finer CD States" task layer 430 being numbered n+m, where n>4, and m>2. Upon descending task hierarchy 400, each task layer includes more and more difficult tasks. For example, the task of recognizing "All Data" at All Data task layer 410 can be considered less difficult than tasks of recognizing "Non-Speech", "Speech", and "Silence" at the Data Types task layer 412. As such, a task at a task level numbered L1 can be considered to be less difficult than a task at task level numbered L2, if L1<L2, the task at task level L1 can be considered to be more difficult than the task at task level L2, if L1>L2, and the tasks can be considered to be approximately equally difficult if L1=L2.

Samples in pools of training samples, such as discussed above in the context of FIGS. 3A and 3B, can be ordered based on task difficulty. For example, each training sample in the pool of training samples can be associated with a task in task hierarchy 400, and thus with an associated level in task hierarchy 400. Training samples can then be ordered based on the level in task hierarchy 400 and thus the training samples can be ordered by (task) difficulty. To order samples in increasing difficulty, samples associated with tasks at a lowest level in task hierarchy 400 can be output first, then samples associated with tasks at a next lowest level in task hierarchy 400 can be output next, and so on, until samples associated with tasks at a lowest level in task hierarchy 400 are output. For example, let P be a pool of training samples, and SP(1) be a sub-pool of P associated with level 1 ("All-Data Layer") task of task hierarchy 400, SP(2) be a sub-pool of P associated with level 2 ("Data Types") task of task hierarchy 400, SP(3) be a sub-pool of P associated with level 3 of task hierarchy 400 and so on down to SP(n+m). Then, training samples of P can be output as sub-pools ordered by task; e.g., to be ordered according to increasing difficulty, P would be output as SP(1), SP(2), SP(3) ... SP(n+m).

In particular cases, a sub-pool of training samples associated with a given level of a task hierarchy can be ordered by difficulty; e.g., ordered according to the duration, quality, previously-trained neural network probability, and/or other values discussed above within the context of FIGS. 3A and 3B. For example, among a sub-pool of training samples associated with a specified level L1 of task hierarchy 400 SP(L1), the samples in SP(L1) can be ordered to be according to duration, quality, previously-trained neural network probability, and/or other values discussed above, and then the samples in SP(L1) can be output according as ordered. The ordered training samples can be output, and in some scenarios, presented to a neural network for training.

FIG. 4A also shows a set of neural networks 440 that can be used to recognize data corresponding to tasks at various levels of task hierarchy 400. Each of neural networks 442, 444, 446, 450, 452, and 454 can be used as an example for neural network 240 discussed above at least in the context of FIG. 2.

Neural network 442 includes an input layer labeled "In", an output layer labeled "Out" and a hidden layer labeled "H". Each layer of a neural network, such neural network 442 can have one or more "neurons" or nodes for computation. The input layer can receive an input, such as data corresponding to spoken speech, and normalize the input; i.e., adjust the input to a predetermined range of values, such as a predetermined range of [−1,+1]. After normalization, the input layer can distribute normalized values as input values to each neuron in a hidden layer connected to the input layer. In some embodiments, there can be a "bias", or constant input of +1, provided to each hidden layer of a neural network. Upon reception at the hidden layer, the bias is weighted and added to the input value going into a neuron at the hidden layer.

The input values from the input layer, if there is only one hidden layer, can arrive at a neuron in a hidden layer. If there are multiple hidden layers, the input layer can be a preceding hidden layer of the neural network. Let the hidden layer have H neurons, H>0, and let j designate a hidden layer neuron, with $1 \le j \le H$. Hidden layer neuron j can receive I inputs, I>1, multiply each input value it receives by a weight $w_{ij}$, where i represents the input from the input layer, and with $1 \le i \le I$. The resulting weighted input values can be added together by hidden neuron j producing a weighted sum $u_j$. In some embodiments, the weighted sum $u_j$ from hidden layer neuron j can be provided as an input to a transfer function, σ, which can output a value $h_j$ from the hidden layer for hidden layer neuron j. The H outputs from the hidden layer are distributed to the output layer, if there is only one hidden layer, or to a subsequent hidden layer, if there are multiple hidden layers in the neural network.

After the values pass through the hidden layer(s), they can arrive at the output layer. Let the output layer have OL neurons, OL>0, and let k designate an output layer neuron, with $1 \le k \le OL$. A value from each hidden layer neuron in the last hidden layer can be provided to output layer neuron k. Output layer neuron k can multiple each value from the hidden layer neurons by a weight $w_{kj}$ where j represents the input from the last hidden layer, with $1 \le j \le H$. Output layer neuron k can add the weighted input values together to produce a weighed sum $v_k$. In some embodiments, the weighted sum $v_k$ from output layer neuron k can be provided as an input to transfer function, σ, which can output a value $v_k$ from the output layer for output layer neuron j. They values can then be output from the neural network.

In some embodiments, a neural network with one hidden layer, such as neural network 442 can be configured to recognize the "Non-Speech", "Speech", and "Silence" data types shown at task level 412. Then, when descending task hierarchy 400 from task level 412 to task level 414, neural network 442 can be modified to recognize "Sound Groups" of task level 414 using one or more additional hidden layers. The modified neural network is shown in FIG. 4A as neural network 444, with an input layer, one hidden layer, and an output layer from neural network 442, shown in both neural networks 442 and 444 as being colored in solid grey, and a second hidden layer for neural network 444, shown in FIG. 4A colored with diagonal grey lines.

Descending task hierarchy 400 another level from task level 414 to task level 416, neural network 444 can be modified to recognize the "Sounds" at task level 416 using one or more additional hidden layers. The modified neural network is shown in FIG. 4A as neural network 446, with an input layer, two hidden layers, and an output layer from neural network 444, shown in both neural networks 444 and 446 as being colored in solid grey and with diagonal grey lines, and a third hidden layer labeled "$H_1$" colored in white in neural network 446.

FIG. 4A shows that the process of descending task hierarchy 400 and adding corresponding hidden layer(s) to an existing neural network can be continued until reaching leaf nodes of task hierarchy 400 and adding corresponding hidden layer(s) for the leaf nodes of task hierarchy 400.

Figure 4B:
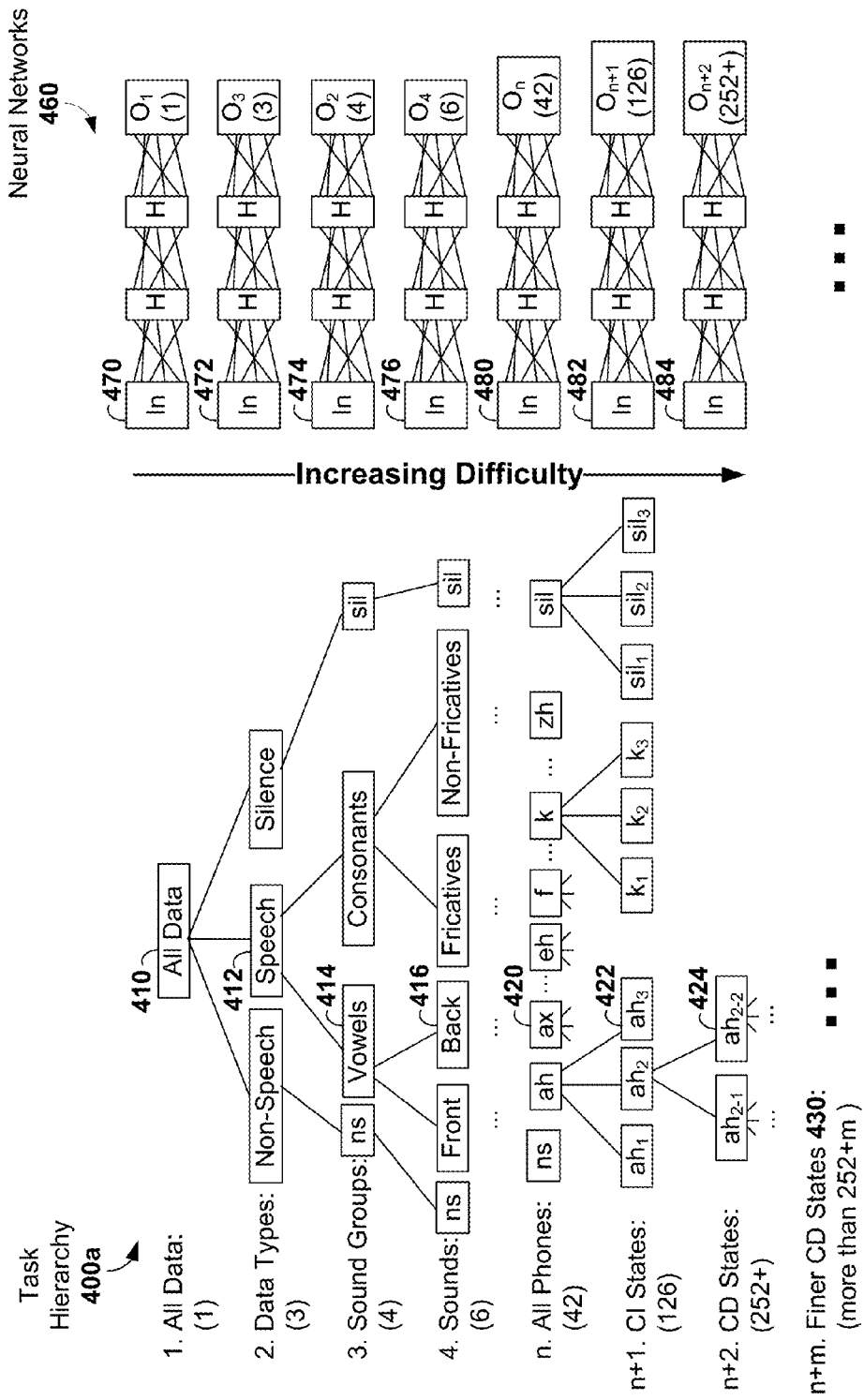
FIG. 4B shows another example task hierarchy and set of neural networks, in accordance with example embodiments.

FIG. 4B shows a task hierarchy 400a and set of neural networks 460, in accordance with example embodiments. Task hierarchy 400a is the same as task hierarchy 400, except that a layer number for each layer is determined by a number of outputs for the layer. The number of outputs for each layer is shown in parentheses in FIG. 4B. For examples, layer 1 of task hierarchy 400a, the "All Data" layer, is shown in FIG. 4B as having one output corresponding to being in the all data class, layer 2 of task hierarchy 400a, the "Data Types" layer, is shown in FIG. 4B as having three outputs corresponding to non-speech, speech, and silence, and layer 3 of task hierarchy 400a, the "Sound Groups" layer, is shown in FIG. 4B as having four outputs corresponding to non-speech (ns), vowels, consonants, and silence (sil). In some embodiments, task hierarchy 400 and/or task hierarchy 400a can include more, fewer, and/or different layers and/or outputs at one or more layers.

Each layer of task hierarchy 400a can correspond to a task to be learned by a neural network. As such, the number of outputs for each layer can be used as a measure of difficulty for the layer, and so the task hierarchy 400a can be ordered by task difficulty by ordering the task hierarchy by the number of outputs for the layer. As such, task hierarchy shows that the "All Data" layer with one output can be considered the least difficult layer, followed by the "Data Types" layer with three outputs, and so on, until reaching the "Finer CD States" layer with "more than 252+n" outputs.

The neural network can be trained on progressively more difficult tasks, for example, by determining task difficulty based on a number of outputs, as indicated by task hierarchy 400a. For example, the neural network can be trained on the "Sounds" task with six outputs, then trained on the "All Phones" task with forty-two outputs, and then on the context-independent (CI) states layer with 126 outputs. Many other examples are possible as well.

A number of samples can be selected for each task from a pool of training samples. In some embodiments, the samples selected for a given task can be the entire pool of samples. In other embodiments, the samples selected for a given task can include two or more identical samples, and in particular embodiments, a selected sample can be copied to generate two or more samples identical to the selected sample. In still other embodiments, the samples can be unordered, randomly ordered, or ordered as discussed above in the context of FIG. 4A. In yet other embodiments, different samples can be selected from the pool of training samples for each task.

FIG. 4B also shows set of neural networks 460 that can be used to recognize data corresponding to tasks at various levels of task hierarchy 400. Each of neural networks 470, 472, 474, 476, 480, 482, and 484 can be used as an example for neural network 240 discussed above at least in the context of FIG. 2.

FIG. 4B shows that each of neural networks 470, 472, 474, 476, 480, 482, and 484 includes an input layer "In", two hidden layers each labeled "H", and an output layer. In some embodiments, some or all of neural networks 470, 472, 474, 476, 480, 482, and 484 can have more, fewer, and/or different layers. In particular embodiments, some or all of neural networks 470, 472, 474, 476, 480, 482, and 484 can have differing numbers of layers, including different numbers of hidden layers.

Each neural network shown in FIG. 4B has a different output layer. For example, neural network 470 corresponding to the "All Data" task is labeled "$O_1$" to indicate an output layer for task number 1 in task hierarchy 400a and with a number of outputs "(1)" shown in parenthesis. As another example, neural network 480 corresponding to the "All Phones" task numbered "n" in task hierarchy 400a has an output layer labeled "$O_n$" having 126 outputs.

In some scenarios, a neural network can be trained on a first task, then later trained on a second task that is more difficult than the first task after replacing the output layer to be suitable for the second task, then later trained on a third task that is more difficult than the second task after replacing the output layer to be suitable for the third task, and so on. Using this technique, knowledge gained by the neural network learning less difficult tasks can be applied to learning a current task.

In particular embodiments, weight values leading to the output nodes of a neural network trained on one task can be used as initialization values for weights leading to a new output layer suitable for the new, more difficult task to be learned. In other embodiments, weight values leading to the output nodes of a neural network trained on one task can be replaced with randomly selected weight values for the new output layer for the new task. In these embodiments, reusing the input and hidden layers trained on one or more tasks while learning a new task can enable transfer of knowledge learned in the reused layers to a new network with a new output layer suitable for a new task.

Example Data Network

Figure 5:
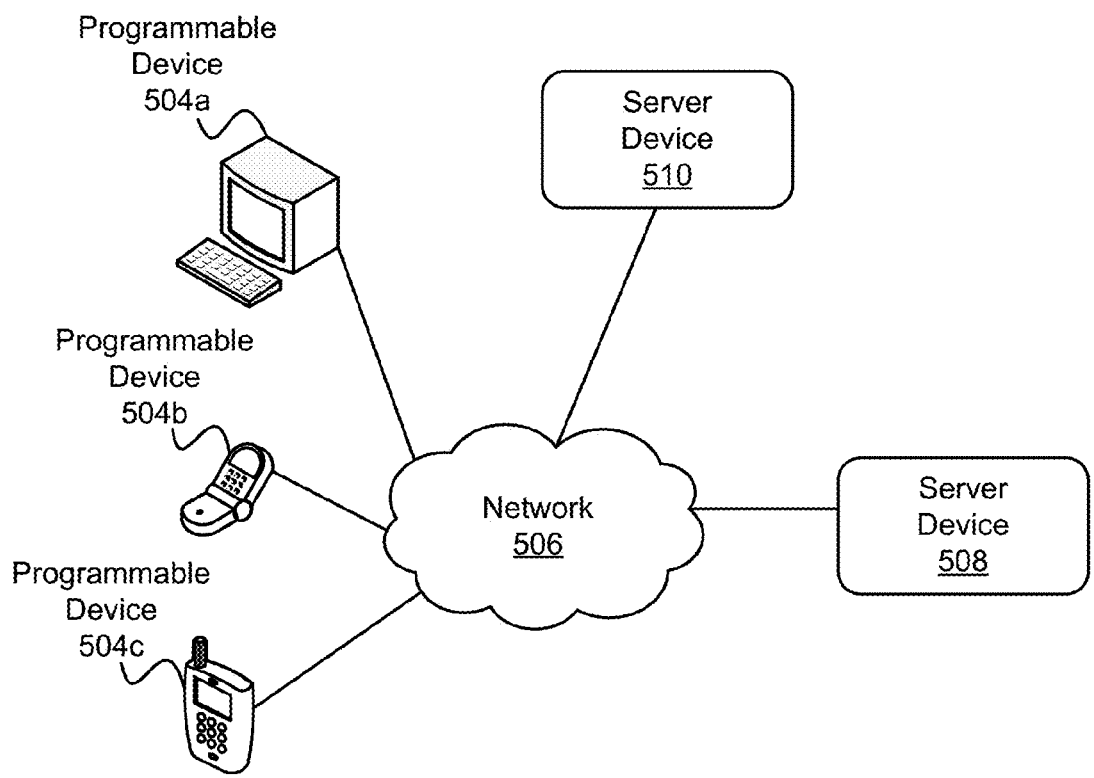
FIG. 5 depicts a distributed computing architecture, in accordance with an example embodiment.

FIG. 5 shows server devices 508, 510 configured to communicate, via network 506, with programmable devices 504a, 504b, and 504c. Network 506 may correspond to a LAN, a wide area network (WAN), a corporate intranet, the public Internet, or any other type of network configured to provide a communications path between networked computing devices. The network 506 may also correspond to a combination of one or more LANs, WANs, corporate intranets, and/or the public Internet.

Although FIG. 5 only shows three programmable devices, distributed application architectures may serve tens, hundreds, or thousands of programmable devices. Moreover, programmable devices 504a, 504b, and 504c (or any additional programmable devices) may be any sort of computing device, such as an ordinary laptop computer, desktop computer, network terminal, wireless communication device (e.g., a cell phone or smart phone), and so on. In some embodiments, programmable devices 504a, 504b, and 504c may be dedicated to the design and use of software applications. In other embodiments, programmable devices 504a, 504b, and 504c may be general purpose computers that are configured to perform a number of tasks and need not be dedicated to software development tools. In still other embodiments, programmable devices 504a, 504b, and/or 504c can be configured to perform some or all of the herein-described functionality of speech recognition device 212. In even other embodiments, server devices 508 and/or 510 can be configured to perform some or all of the herein-described functionality of speech recognition device 212.

Server devices 508, 510 can be configured to perform one or more services, as requested by programmable devices 504a, 504b, and/or 504c. For example, server device 508 and/or 510 can provide content to programmable devices 504a-504c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 508 and/or 510 can provide programmable devices 504a-504c with access to software for database, search, computation, graphical, audio, video, World Wide Web/Internet utilization, and/or other functions. Many other examples of server devices are possible as well.

Computing Device Architecture

Figure 6A:
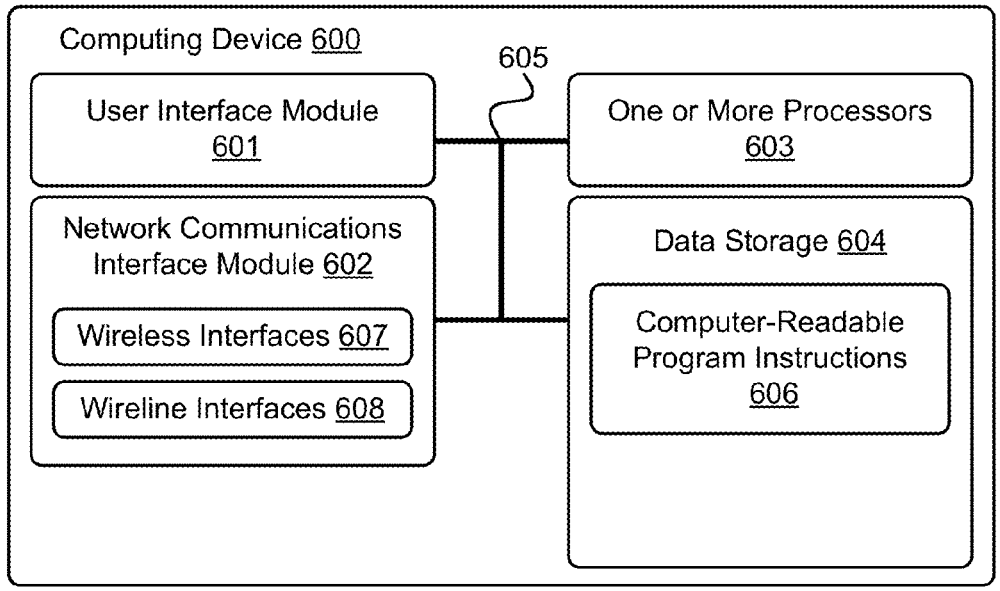
FIG. 6A is a block diagram of a computing device, in accordance with an example embodiment.

FIG. 6A is a block diagram of a computing device (e.g., system) in accordance with an example embodiment. In particular, computing device 600 shown in FIG. 6A can be configured to perform one or more functions of speech recognition device 212, neural networks 240, 440, 442, 444, 446, 450, 452, and/or 454, server devices 508, 510, network 506, and/or one or more of programmable devices 504a, 504b, and 504c. Computing device 600 may include a user interface module 601, a network-communication interface module 602, one or more processors 603, and data storage 604, all of which may be linked together via a system bus, network, or other connection mechanism 607.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network, such as network 506 shown in FIG. 5. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 603 can include one or more general purpose processors and/or one or more special purpose processors (e.g., digital signal processors, application specific integrated circuits, etc.). Processors 603 can be configured to execute computer-readable program instructions 606 that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods and techniques and/or at least part of the functionality of the herein-described devices and networks.

Cloud-Based Servers

Figure 6B:
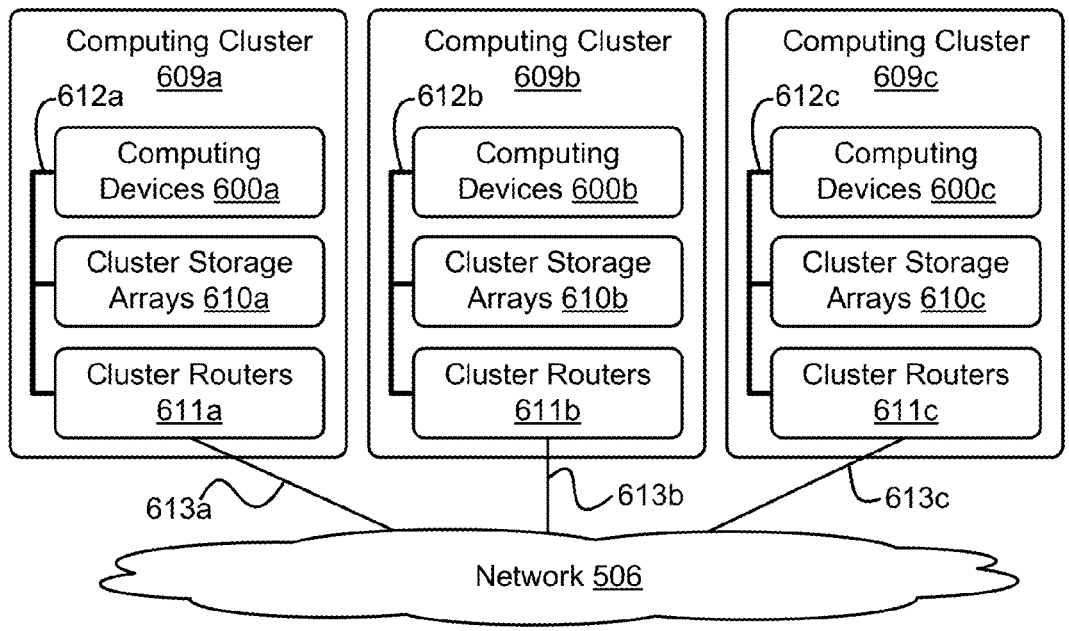
FIG. 6B depicts a cloud-based server system, in accordance with an example embodiment.

FIG. 6B depicts a network 506 of computing clusters 609a, 609b, 609c arranged as a cloud-based server system in accordance with an example embodiment. Server devices 508 and/or 510 can be cloud-based devices that store program logic and/or data of cloud-based applications and/or services. In some embodiments, server devices 508 and/or 510 can be a single computing device residing in a single computing center. In other embodiments, server device 508 and/or 510 can include multiple computing devices in a single computing center, or even multiple computing devices located in multiple computing centers located in diverse geographic locations. For example, FIG. 6 depicts each of server devices 508 and 510 residing in different physical locations.

In some embodiments, data and services at server devices 508 and/or 510 can be encoded as computer readable information stored in tangible computer readable media (or computer readable storage media) and accessible by programmable devices 604a, 604b, and 604c, and/or other computing devices. In some embodiments, data at server device 508 and/or 510 can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, the functions of server device 508 and/or 510 can be distributed among three computing clusters 609a, 609b, and 608c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of electronic communications server 612. In one embodiment, the various functionalities of electronic communications server 612 can be distributed among one or more of computing devices 600a, 600b, and 600c. Computing devices 600b and 600c in computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with server devices 508 and/or 510 can be distributed across computing devices 600a, 600b, and 600c based at least in part on the processing requirements of server devices 508 and/or 510, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 508 and/or 510 can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store the data of server device 508, while other cluster storage arrays can store data of server device 510. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 601a via the local cluster network 612a, and (ii) wide area network communications between the computing cluster 609a and the computing clusters 609b and 609c via the wide area network connection 613a to network 506. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving, at a computing device, training samples for training a neural network to learn an acoustic speech model, wherein at least one training sample of the training samples represents at least one phone of captured speech;
   determining a curriculum function for acoustic speech modeling, wherein the curriculum function assigns a difficulty value for a designated training sample of the training samples based on a combination comprising a duration value for the designated training sample and a sound quality value for the designated training sample;
   for each training sample of the training samples, determining a corresponding difficulty value for the training sample using the curriculum function;
   ordering the training samples based on the corresponding difficulty values for the training samples;
   presenting the ordered training samples to the neural network using the computing device to train the neural network on at least a portion of the acoustic speech model; and
   recognizing a received speech sample using the trained neural network.

2. The method of claim 1, wherein at least one training sample of the training samples represents a triphone of captured speech.

3. The method of claim 1, wherein a training sample corresponding to a lower difficulty value is less difficult for the neural network to process than a training sample corresponding to a higher difficulty value.

4. The method of claim 1, wherein ordering the training samples based on the corresponding difficulty values for the training samples comprises ordering the training samples so that training samples corresponding to lower difficulty values are presented to the neural network before samples corresponding to higher difficulty values.

5. The method of claim 1, wherein the combination further comprises an estimate from a posteriori estimator function.

6. The method of claim 1, wherein the combination further comprises a previously trained neural network probability value for the particular sample.

7. The method of claim 1, further comprising:
   receiving, as an input to the trained neural network, a second plurality of samples corresponding to captured human speech, wherein at least some samples in the second plurality of samples differ from the training samples; and
   in response to receiving the second plurality of samples, generating a plurality of phones corresponding to the captured human speech using the trained neural network.

8. A method, comprising:
   receiving, at a computing device, a plurality of training samples for training a neural network to learn an acoustic speech model, wherein at least one training sample of the plurality of training samples represents at least one phone of captured speech;
   training the neural network to learn the acoustic speech model based on an ordering of a plurality of tasks using the computing device, wherein the ordering is based on a curriculum function that assigns a difficulty value to a designated training sample of the plurality of training samples based on a combination comprising a duration value for the designated training sample and a sound quality value for the designated training sample;
   for each task in the ordered plurality of tasks, using the computing device for:
   selecting one or more training samples from the plurality of training samples for the task, and
   teaching the task to the neural network by presenting the selected one or more training samples to the neural network; and
   recognizing a received speech sample using the trained neural network.

9. The method of claim 8, wherein determining the ordering of the plurality of tasks comprises:
   determining a number of outputs for each task in the plurality of tasks; and
   ordering the plurality of tasks based on the plurality of numbers of outputs.

10. The method of claim 8, wherein selecting the one or more training samples comprises selecting all of the plurality of training samples as the one or more training samples.

11. The method of claim 8, wherein the tasks are ordered based on a task hierarchy that has a plurality of levels, and wherein a task T1 at a specified level L1 of the task hierarchy is less difficult than each task at a level L2, and wherein the level L2 is below the specified level L1 in the task hierarchy.

12. The method of claim 8, wherein the plurality of tasks comprises a task associated with phones, a task associated with context independent sounds, and a task associated with context-dependent sounds.

13. A computing device, comprising:
   a processor; and
   a computer-readable storage medium having stored thereon program instructions that, upon execution by the processor, cause the computing device to perform operations comprising:
   receiving training samples for training a neural network to learn an acoustic speech model, wherein at least one training sample of the training samples represents at least one phone of captured speech,
   determining a curriculum function for acoustic speech modeling, wherein the curriculum function assigns a difficulty value for a designated training sample of the training samples based on a combination comprising a duration value for the designated training sample and a sound quality value for the designated training sample, for each training sample of the training samples, determining a corresponding difficulty value for the training sample using the curriculum function, ordering the training samples based on the corresponding difficulty values for the training samples, presenting the ordered training samples to train the neural network on at least a portion of the acoustic speech model, and recognizing a received speech sample using the trained neural network.

14. The computing device of claim 13, wherein at least one training sample of the training samples represents a triphone of captured speech.

15. The computing device of claim 13, wherein a sample corresponding to a lower difficulty value is less difficult for the neural network to process than a sample corresponding to a higher difficulty value.

16. The computing device of claim 13, wherein ordering the training samples based on the corresponding difficulty values for the training samples comprises ordering the training samples so that training samples corresponding to lower difficulty values are presented to the neural network before samples corresponding to higher difficulty values.

17. The computing device of claim 13, wherein the combination further comprises an estimate from a posteriori estimator function.

18. An article of manufacture including a non-transitory computer-readable storage medium having stored thereon program instructions that, upon execution by a computing device, cause the computing device to perform operations comprising:

receiving training samples for training a neural network to learn an acoustic speech model, wherein at least one training sample of the training samples represents at least one phone of captured speech;

determining a curriculum function for acoustic speech modeling, wherein the curriculum function assigns a difficulty value for a designated training sample of the training samples based on a combination comprising a duration value for the designated training sample and a sound quality value for the designated training sample;

for each training sample of the training samples, determining a corresponding difficulty value for the training sample using the curriculum function;

ordering the training samples based on the corresponding difficulty values for the training samples;

presented presenting the ordered training samples to train the neural network on at least a portion of the acoustic speech model; and recognizing a received speech sample using the trained neural network.

19. The article of manufacture of claim 18, wherein at least one training sample of the training samples represents a triphone of captured speech.

20. The article of manufacture of claim 18, wherein a sample corresponding to a lower difficulty value is less difficult for the neural network to process than a sample corresponding to a higher difficulty value.

21. The article of manufacture of claim 18, wherein ordering the training samples based on the corresponding difficulty values for the training samples comprises ordering the training samples so that training samples corresponding to lower difficulty values are presented to the neural network before samples corresponding to higher difficulty values.

22. The article of manufacture of claim 18, wherein the combination further comprises an estimate from a posteriori estimator function.

* * * * *